Oct. 29, 1963  R. H. KUHNAPFEL ET AL  3,109,054
STEM ASSEMBLY FOR ELECTRICAL COMPONENTS
Filed Feb. 9, 1959

INVENTORS
ROBERT H. KUHNAPFEL
BY WILLIAM SARDO

ATTORNEY

United States Patent Office 3,109,054
Patented Oct. 29, 1963

3,109,054
STEM ASSEMBLY FOR ELECTRICAL COMPONENTS
Robert H. Kuhnapfel, Wanamassa, and William Sardo, Red Bank, N.J., assignors to The Bendix Corporation, a corporation of Delaware
Filed Feb. 9, 1959, Ser. No. 792,048
1 Claim. (Cl. 174—152)

The present invention relates to metal-ceramic seal type insulating headers and more particularly to metal-ceramic stem assemblies for vacuum tubes.

Various methods have been utilized in making metal to ceramic seals in the past, however, the type of seal involving a solid rod or wire of metal being sealed into a hole presents unusual problems. The conventional approach is to use an inner metal part having a lower coefficient of expansion than the ceramic, for example molybdenum, so that as the brazed part cools below the temperature, at which the brazing material solidifies, the ceramic part shrinks around the pins causing the seal to be in a state of compression. Where an outer seal is required, a metal having a higher coefficient of expansion is utilized which will shrink around the ceramic to place the seal in compression. One disadvantage in the aforenoted method is that the metals with suitable expansion coefficients for the inner parts are the refractories, for example molybdenum, tungsten, rhenium, etc., or their various alloys. These materials oxidize excessively in atmosphere at operating or processing temperatures of the end product. Difficulty is encountered in any attempts to plate against oxidizing. Further, these materials are likely to become embrittled during brazing with the results that the outer pins of the finished product are likely to fracture in normal use.

A further problem arises from the difference in heat conduction between the pins and the ceramic. The metal pins have a greater heat conduction rate, hence, they heat or cool faster than the ceramic and there may be a considerable difference in temperature. This may result in seal fatigue.

The present invention provides a vacuum tight metal-ceramic stem which overcomes the above disadvantages by the use of molybdenum as the inner portion of the pin and a suitable metal, less subject to oxidation or embrittlement. A further improvement utilizes a metallized ceramic rod between the two sections.

It is an object of the invention to provide an improved metal-ceramic stem.

Another object of the invention is to provide a metal-ceramic stem that will withstand severe thermal shock.

Another object of the invention is to provide improved means for making a vacuum tight seal between a ceramic disc and a rod extending therethrough.

Another object of the invention is to provide an improved metal-ceramic stem which will yield reliable seals in manufacture.

The above and other objects and features of the invention will appear more fully hereinafter from a consideration of the following description taken in connection with the accompanying drawing, wherein two embodiments are illustrated by way of examples.

Figure 1:
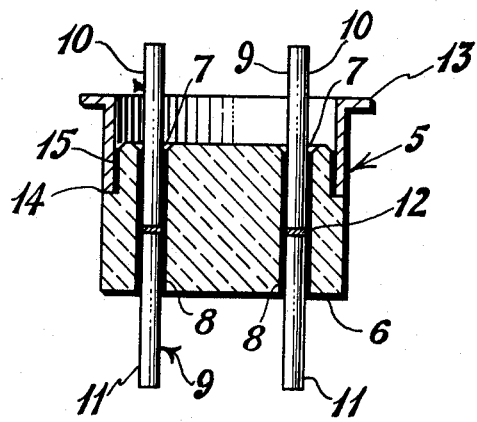
FIGURE 1 is a sectional view of a stem illustrating one embodiment.

Referring now to FIGURE 1 of the drawing, a stem assembly is indicated generally by the numeral 5 and is of a type adapted for use in vacuum tubes or other devices requiring seal type insulating headers. The stem assembly 5 has a body portion 6 of a ceramic material which not only is a good insulator but is also able to withstand high temperatures. The ceramic body 6 has a plurality of holes 7 extending therethrough which are provided with a metallized coating 8 extending throughout the length thereof.

Pin assemblies 9 are inserted through the holes 7 and are brazed thereto as will be explained later. The pin assembly 9 has an inner section 10 of molybdenum and an outer section 11 of a material less subject to oxidation or embrittlement, for example a nickel-iron alloy, stainless steel or Monel. A brazing disc 12, of a suitable material such as Au–Ni (gold-nickel alloy), secures the sections 10 and 11 to form a unitary structure.

A metal ring 13 of a material having a higher coefficient of expansion than ceramic, for example Monel, may be positioned around the ceramic body 6 as means for securing the stem 5 to a suitable envelope (not shown). The body 6 may be provided with a step 14 for positioning the ring 13 with a metallized portion 15 adjacent to the ring 13.

With the parts assembled as described, the stem 5 is heated to a temperature sufficient to braze the parts together to form a unitary structure. As the parts cool below the brazing material solidus, the ceramic body shrinks around the molybdenum stem to form a compression seal therewith. As the ring 13 has a higher coefficient of expansion than the ceramic, it will shrink around the ceramic to again place the seal in compression.

Figure 2:
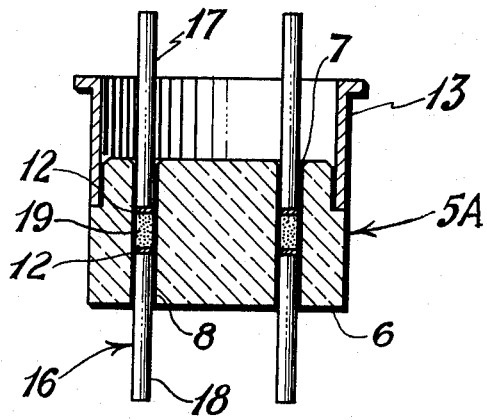
FIGURE 2 is a cross section of a stem illustrating another embodiment of the invention.

Referring now to FIGURE 2, wherein like parts will be assigned the same reference numerals as in FIGURE 1, only the differences will be explained in detail.

A stem assembly indicated generally by the numeral 5A is similar to the stem assembly 5 in FIGURE 1, except for pin assembly 16. The pin assembly 16 has an inner section 17 and an outer section 18 of suitable material with a center section 19 of a metallized ceramic rod. Brazing discs 12 are positioned between the section 17 and center section 19 and also between the section 18 and the section 19.

Upon the assembly 16 being heated to the brazing temperature, the brazing material fills the space between the various parts and provides a seal between the ceramic body 6 and the ceramic rod 19. The metallized ceramic rod filling the center area matches the button coefficient of expansion exactly. Further, the specific heat and heat conduction properties are identical. This matching of the two ceramic parts provides a seal that is less critical for temperature changes and has increased seal reliability. The inner and outer pins are not relied upon for a vacuum seal hence this leaves a wider choice of materials for the same.

Although only two embodiments of the invention have been illustrated and described, various changes in the form and relative arrangement of the parts which will now appear to those skilled in the art, may be made without departing from the scope of the invention.

What is claimed is:

An insulating header comprising a ceramic member having holes extending therethrough, a metallized coating on the interior of said holes, a pin assembly extending through said holes, said pin assembly having an inner section of a conducting material, a center section of ceramic having a metallized coating thereon and an outer section of a conducting material, and brazing material positioned between said sections for uniting said sections in a unitary structure and coacting with said metallized section to form a vacuum-tight seal between said ceramic section and said ceramic member.

(References on following page)

References Cited in the file of this patent

UNITED STATES PATENTS

| | | |
|---|---|---|
| 2,436,644 | Halstead | Feb. 24, 1948 |
| 2,450,780 | Bucklen | Nov. 4, 1948 |
| 2,617,068 | Spinnler et al. | Nov. 4, 1952 |
| 2,837,679 | Schwartzwalder et al. | June 3, 1958 |

FOREIGN PATENTS

| | | |
|---|---|---|
| 699,492 | Great Britain | Nov. 11, 1953 |
| 764,241 | Great Britain | Dec. 19, 1956 |
| 61,043 | France | Sept. 29, 1954 |
| | (1st addition to 1,022,297) | |